June 4, 1963  W. L. COOK ETAL  3,092,360
POSITIVE LOCKING FAIRLEAD FOR ELECTRICAL CABLES
Filed Feb. 8, 1962
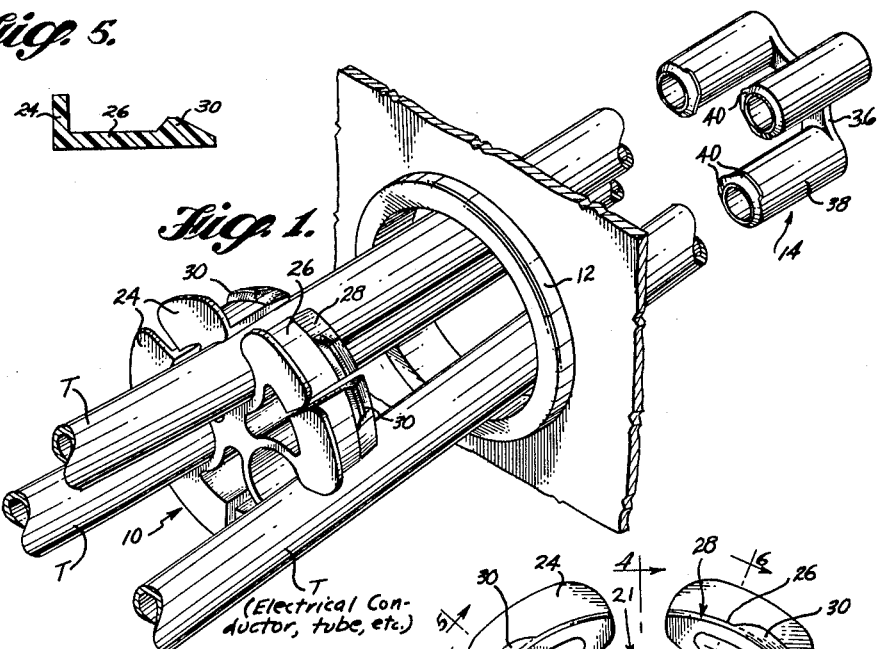
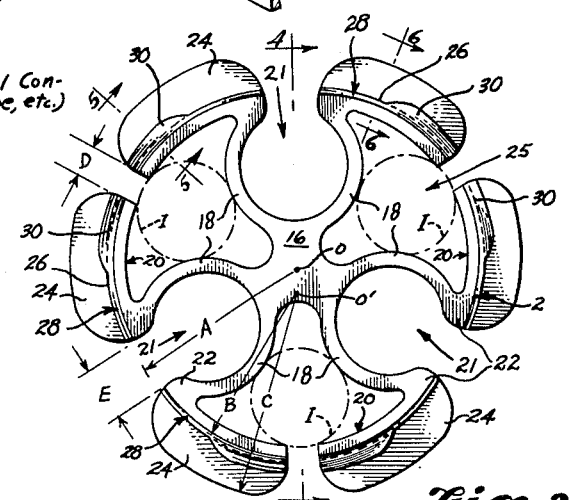
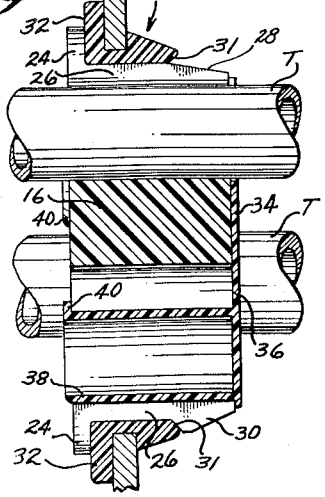
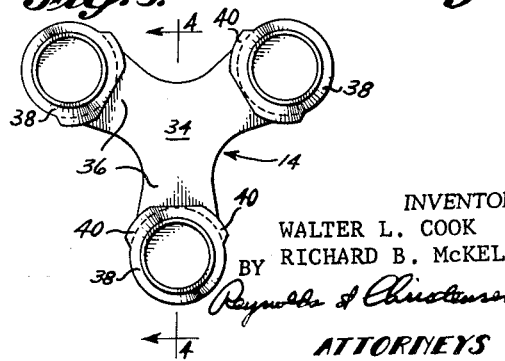
INVENTORS
WALTER L. COOK
RICHARD B. McKELVEY
BY
ATTORNEYS

United States Patent Office 3,092,360
Patented June 4, 1963

3,092,360
POSITIVE LOCKING FAIRLEAD FOR
ELECTRICAL CABLES
Walter L. Cook, Seattle, and Richard B. McKelvey, Bellevue, Wash., assignors to The Boeing Company, Seattle, Wash., a corporation of Delaware
Filed Feb. 8, 1962, Ser. No. 171,921
6 Claims. (Cl. 248—56)

This invention relates to an improvement in the fairlead described and claimed in a companion application filed by Walter L. Cook on Feb. 8, 1962, Serial No. 171,922, and entitled Fairlead for Electrical Cables, said fairlead being for the purpose of securing a plurality of elongated elements such as electrical cables and the like within an apertured member through which such elements extend. More particularly, it relates to a fairlead combination that can be installed by hand in an aperture in a panel or other member or in a grommet fitted into the aperture to secure such elements in transversely spaced relationship therein with means provided to lock the fairlead positively in the aperture once installed. While the invention is herein illustratively described in terms of a particular presently preferred form thereof, it will be recognized that certain modifications and changes therein may be made with respect to details in construction without departing from the essential features involved.

Bushings, grommets and the like previously used for securing wires and cables within apertures have involved common inherent disadvantages. Typical of these are necessity for threading the wires through the fitting, construction from a multiplicity of different materials, necessity for altering wall construction to accommodate the fitting, necessity for use of tools and separate fastening means such as nuts and bolts, rivets, screws, clamps and the like for installation. It is a principal object of this invention to overcome such disadvantages in prior devices by providing an improved hand-operable fairlead with a hand-installable locking member of simple construction and operation and manufactured conveniently from one material throughout, possessing none of the above-mentioned undesirable characteristics.

More particularly, it is an important object hereof to provide a simple fairlead combination which permits quick installation by hand without necessity for use of tools or separate fastening elements.

A related object of this invention is to provide an improved multisocket fairlead into which a plurality of elongated elements may be pressed laterally of themselves, and which may then be installed in an aperture by sliding it lengthwise of the elements and conveniently snapping the locking member into place, all by hand without increasing or being affected by the gripping force on the elements.

A further specific object of this invention is to provide a fairlead combination for electrical cables and the like which is light in weight for use particularly in aircraft and in other places where reduction in weight is an advantage.

Another object hereof is to provide such a fairlead combination of low initial cost and maintenance because of its simplicity of construction, simple hand installation, removability, and reusability.

An additional object hereof is to provide such a fairlead combination which may be easily constructed of high-temperature thermoplastic material for use in high-temperature environments.

To achieve the above objects this invention provides a spider-like fairlead of snap-in form preferably of integral one-piece thermoplastic construction featuring pairs of resilient gripping arms, the members of each pair carrying outer peripherally extending segments having lock tabs formed thereon to secure the fairlead within an aperture in a panel or the like or in a grommet or bushing fitting within the aperture. The gripping arms of each pair may be spread apart to receive an elongated element pressed laterally of itself into the reentrant space between such arms. The peripheral segments are deflectable radially of the fairlead to permit snapping the lock tabs into place within the opening or a cooperating collar bushing. The accompanying cooperating collar bushing comprises a relatively simple fitting adapted to be snapped securely into the panel opening and to receive the fairlead pressed axially therein. The locking member comprises a base and a plurality of substantially parallel extensions mounted thereon and adapted to be removably inserted into the voids between pairs of gripping arms in the fairlead. In addition to the resilient action of the peripheral locking segments themselves, this fitting prevents deflection of the lock tabs from their locking position after installation of the fairlead, thus improving its gripping action. It also prevents arm deflection, hence displacement of the wires or other elements held in the sockets between pairs of arms.

These and other features, objects and advantages of the invention will become more apparent from the following detailed description taken in connection with the accompanying drawings which illustrate a preferred embodiment thereof.

FIGURE 1 is an exploded perspective view showing the fairlead, collar and cooperating locking member at an intermediate stage of installation.

FIGURE 2 is an end view of the fairlead shown in FIGURE 1, taken looking away from the panel toward the fairlead.

FIGURE 3 is an end view of the locking member shown in FIGURE 1, taken looking away from the panel toward the locking member.

FIGURE 4 is a sectional view taken on line 4—4 of FIGURES 2 and 3 showing the fairlead and locking member installed within the cooperating collar bushing, and showing portions of elements supported therein.

FIGURE 5 is a sectional view taken on line 5—5 of FIGURE 2.

FIGURE 6 is a sectional view taken on line 6—6 of FIGURE 2.

The invention comprises the spider-like fairlead 10 and in combination therewith the optional circular collar or grommet 12 and the locking member 14. Although the fairlead combination may be constructed of any suitably flexible material, in its preferred form it is made of resilient thermoplastic material such as nylon or high temperature plastic by the well known injection molding process.

In the form illustrated the fairlead 10 has a central body portion 16 and pairs of resilient gripping arms 18 projecting generally radially outward therefrom. While the invention encompasses a fairlead which may be designed to grip any selected number of elongated elements, in the case illustrated three pairs of gripping arms are provided. The members of these pairs of gripping arms or bands 18 form a socket or open loop adapted to receive an elongated element pressed laterally of itself into the loop. At the outer extremities these gripping arms 18 carry peripherally extending segments 20 each elbowed oppositely away from that carried by the other member of the pair.

The peripheral segments 20 extend in generally circular series arrangement to define the periphery of the fairlead.

Each includes a flanged forward portion 24, the forward surface of which defines part of the forward face of the fairlead itself. Extending rearwardly from the flanged portion 24 is the generally uniform bearing region 26 which engages the inside surface of the circular collar bushing 12 when the fairlead is inserted therein. Bearing region 26 is followed by a tapered region 28 forming approximately half of the rear edge of the segment adjacent the loop opening 21. An outwardly projecting lock tab 30 is formed on the rear edge of each segment at its deflectable end portion opposite the loop opening 21. The lock tabs 30 are tapered rearwardly to facilitate insertion of the fairlead into the panel or collar bushing aperture.

Each peripheral segment 20 is biased outwardly at its radially deflectable free end to provide greater resilient gripping action when installed. Thus, with the fairland in its uninstalled, relaxed condition, radius A is substantially equal to the inside diameter of the aperture into which the fairlead is to be inserted. The peripheral segments 20, however, have different radii, as indicated by arrows B and C, and different centers of curvature O' spaced from the center O of the fairlead as shown. At their free ends the peripheral segments 20 are spaced from each other a distance D of the order of one-third to one-half of the diameter of the elements (i.e., electric cables, etc.) to be carried by the fairlead. Spacing E between peripheral segments 20 at the loop openings is slightly less than half the diameter of such elements.

When an elongated element T is pressed laterally of itself into the space 21 between corresponding gripping arms 18, the gripping arms and peripheral segments 20 are deflected apart circumferentially to admit it as shown in FIGURE 1. Because of the described unique dimensional relationship, the free ends of the peripheral segments involved deflect toward respective adjacent peripheral segments substantially meeting the same and then returning to their initial positions as the inserted element T reaches installed position in the socket space. It is not necessary for their free ends to overlap as the elements are inserted.

After such elements are installed, the fairlead is then snapped into place within the circular collar bushing 12 or similarly formed aperture in the panel itself. During such insertion the free ends of the peripheral segments 20 are deflected radially inward of the fairlead to permit passage of the lock tabs 30 into and through the collar or aperture without increasing or being affected by the gripping force on the elements held between the gripping arms 18. When thus installed the fairlead takes the position shown in FIGURE 4 with the tapered lock tabs 30 resiliently gripping corresponding tapered surfaces 31 of the collar 12 while the cooperating flanged portions 24 engage the forward surface 32 of the collar.

The gripping arms 18 and connecting regions 22 supporting the peripheral segments 20 may be varied in size to increase or decrease the gripping pressure and the pressure required to insert and remove the fairlead into and from the collar.

Locking member 14 is provided to assure against accidental deflection of locking tabs 30 from their gripping positions and consequent freeing of the fairlead from the panel. It also prevents spreading of the socket arms. The preferred form of locking member first comprises a base 34 adapted to fit centrally among elements installed in the fairlead and having a plurality of web portions 36 each extending laterally into the spacing between adjacent installed elements. Each such web portion 36 carries at its outer extremity a generally cylindrical extension 38 adapted to be inserted into a corresponding void 25 between adjacent pairs of gripping arms 18. When installed, the cylindrical extensions 38 engage the deflectable free ends of locking segments 20 as indicated by the dotted circles I in FIGURE 2, thereby preventing their inward deflection. Extensions 38 are constructed longer than the depth of the fairlead 10 in this case and are each provided with a pair of laterally protruding locking lips 40 to hold the lock member in place within the fairlead. Extensions 38 are hollow to provide compressibility whereby locking lips 40 may be manually deflected to permit removal of the lock member 34.

While the invention has been herein illustratively described in terms of a particular preferred form thereof, this form is to be taken merely as illustrative rather than limitative of the invention, its scope being defined by the appended claims.

We claim as our invention:

1. The combination of a multisocket fairlead and a cooperating locking member for securing a plurality of elongated elements in transversely spaced relationship in an apertured object through which they extend, said fairlead comprising a plurality of interconnected circumferentially distributed pairs of members resiliently yieldable apart circumferentially to accommodate elongated elements pressed radially inwardly between the members of the respective pairs, and securing means carried at the outer ends of at least certain of said resiliently yieldable members, said securing means including elements resiliently urged radially outwardly but yieldable inwardly for insertion into the aperture substantially independently of resilient yielding action of said members, and said cooperating locking member comprising a plurality of substantially parallel extensions each having an end secured to a common base, said extensions being insertable between adjacent pairs of said members in abutment to the respective securing means thereby to prevent inward yielding of said securing means.

2. The combination defined in claim 1 wherein said extensions are of elongated form secured at one end to said base to project therefrom.

3. The combination defined in claim 2 wherein said base is of web-like form having angularly spaced arms received in the spaces between said elongated elements, each said arm carrying one of said extensions mounted at its outer extremity.

4. The combination defined in claim 3 wherein said extensions comprise elongated substantially tubular members of length greater than the thickness of said fairlead in the direction of extent of said supported elongated elements, each said tubular member having mounted on its projecting end locking means adapted to grip said fairlead but yieldable to allow disengagement of the locking member from the fairlead.

5. The combination of a fairlead and cooperating locking member for supporting a plurality of elongated elements in transversely spaced relationship in a panel opening through which they extend, said fairlead comprising a plurality of circumferentially spaced pairs of resiliently acting gripping arms having inner end portions interconnected and having outer end portions projecting toward the periphery of the fairlead and resiliently deflectable apart circumferentially of said periphery to pass an elongated element therebetween, a plurality of locking elements releasably engageable with the edge of said opening to maintain positioning of the fairlead therein, and resiliently acting supports for said locking elements connected to the arms and urging the locking elements outwardly against the edge of the opening in respective spaces between pairs of gripping arms while permitting resiliently inward yielding thereof to allow forcible disengagement of the locking elements from the panel, said locking member comprising a base and a plurality of angularly spaced, substantially parallel projections connected thereto and having extremities insertable between pairs of gripping arms of said fairlead in abutment to said locking element supports, thereby to prevent inward yielding of said supports.

6. The apparatus defined in claim 5 wherein said base comprises a plurality of interconnected, angularly spaced arms receivable between said elongated elements supported in said fairlead, each such arm carrying at least one of said projections, each said projection including locking means mounted adjacent the extremity thereof and protruding laterally but yieldable inwardly to releasably grip said fairlead cooperatively between said locking means and said base.

References Cited in the file of this patent

UNITED STATES PATENTS

| | | |
|---|---|---|
| 1,821,294 | Dieter | Sept. 1, 1931 |
| 1,952,695 | Webb | Mar. 27, 1934 |
| 3,011,745 | Reid | Dec. 5, 1961 |
| 3,016,562 | Reid | June 16, 1962 |

FOREIGN PATENTS

| | | |
|---|---|---|
| 856,663 | Great Britain | Dec. 21, 1960 |